Patented Jan. 5, 1954

2,665,202

UNITED STATES PATENT OFFICE 2,665,202

ORGANIC THIOCYANATE HERBICIDES

David T. Mowry and Arthur H. Schlesinger, Dayton, Ohio, assignors to Monsanto Chemical Company, St. Louis, Mo., a corporation of Delaware No Drawing. Application September 26, 1951, Serial No. 248,466

2 Claims. (Cl. 71—2.3)

The present invention provides the hitherto unknown 2-phenoxyethyl thiocyanate, a method of producing the same, herbicidal compositions comprising the new compound, and methods of destroying living plants in which methods the present hebicidal compositions are used.

2-phenoxyethyl thiocyanate is readily prepared by contacting a suitable 2-phenoxyethyl halide with an inorganic thiocyanate substantially according to the scheme

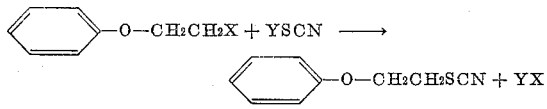

in which X is a member of the class consisting of chlorine and bromine and Y is a member of the class consisting of ammonium and alkali and alkaline earth metals. 2-phenoxyethyl halides suitable for the present purpose include 2-phenoxyethyl bromide and 2-phenoxyethyl chloride. Inorganic thiocyanates which may be employed include potassium, sodium, lithium, barium, calcium, strontium, magnesium and ammonium thiocyanates.

The reaction occurs by contacting the phenoxyethyl halide with the inorganic thiocyanate at ordinary or increased temperatures; however, for optimum yields of the 2-phenoxyethyl thiocyanate it is preferred to heat a mixture of the phenoxyethyl halide and the inorganic thiocyanate advantageously in the presence of an inert solvent or diluent, at a temperature of from, say, 60° C. to the refluxing temperature of the reaction mixture for a time of, say, for a few minutes to several hours. As inert diluents there may be employed aliphatic, oxygen-containing compounds such as methanol, ethanol, isopropanol, isobutanol, acetone, ethyl acetate and isopropyl ether; nitro compounds such as the nitroparaffins and nitrobenzene, etc. In order to facilitate removal of the inorganic halide which is formed as a by-product, it is preferred to employ as a diluent a liquid in which the halide is substantially insoluble; hence, an alcoholic or ketonic diluent is generally preferred.

Inasmuch as the condensation inovlves one mole of the phenoxyethyl halide with one mole of the inorganic thiocyanate, stoichiometric proportions of the reactants are advantageously employed. However, since any excess of either the halide or the thiocyanate may be readily recovered from the final product, the quantity of reactants initially employed is immaterial. It is preferred, however, to use an excess of the more readily available inorganic thiocyanate in order to assure complete reaction of the phenoxyethyl halide under the reaction conditions employed.

2-phenoxyethyl thiocyanate is a stable, rather high boiling material having a pleasant aromatic odor. It is particularly valuable as a herbicide, but it also may be advantageously employed as an insecticide and pesticide in general, as a rubber compounding chemical, etc. It is also valuable as an intermediate in the production of other industrially important materials.

The invention is further illustrated, but not limited, by the following examples:

Example 1

To a solution of 60 g. of potassium thiocyanate in 1700 ml. of absolute ethanol there was added 85 g. of 2-phenoxyethyl chloride. The whole was refluxed for a total of about 11 days, during which time potassium chloride formed in the condensation was removed from the reaction zone at intrevals (at the end of the 1, 4, 5, 6, 9 and 11 days, respectively) by cooling the reaction mixture and filtering off the precipitated potassium chloride. The reaction mixture from which a total of 31.8 g. of potassium chloride had been removed, was then submitted to distillation in order to remove the ethanol. Water was added to the residue, the resulting organic layer was separated and the aqueous phase extracted with carbon tetrachloride. The combined organic layer and extract was distilled to give 58.5 g. (61.5% theoretical yield) of the substantially pure 2-phenoxyethyl thiocyanate, B. P. 157–9° C./5 mm., $n_D^{25}$ 1.5579, and analyzing as follows:

|  | Found | Calcd. for $C_9H_9ONS$ |
|---|---|---|
| Percent C | 60.45 | 60.4 |
| Percent H | 4.73 | 5.02 |

Example 2

Herbicidal activity of a number of thiocyanates, including the 2-phenoxyethyl thiocyanate of the preceding example, was determined by germination of cucumber seeds for 4 days at a temperature of 76° F. in the presence of aqueous solutions or suspensions of each of the indicated chemicals at concentrations of 100 p. p. m. Seventy-five seeds were used for each test. The results are expressed as per cent length of the primary roots in the presence of the chemical compared with the length of the primary roots which had been germinated in water.

| Compound Tested | Percent Growth at 100 Parts Per Million |
|---|---|
| 2-phenoxyethyl thiocyanate | 10 |
| 2,4-dichlorobenzyl thiocyanate | 55 |
| α-(Thiocyanomethyl)naphthalene | 46 |
| Butyl thiocyanate | 94 |
| 4-isopropyl-1,3-xylylene dithiocyanate | 94 |

The herbicidal efficiency of the 2-phenoxyethyl thiocyanate is remarkable because, as shown above, thiocyano compounds, generally do not possess great herbicidal efficiency.

*Example 3*

Spray testing of the herbicidal activity of the 2-phenoxyethyl thiocyanate of Example 1 was effected as follows:

A 1% aqueous suspension of the thiocyanate was prepared, employing 0.2% of an emulsifying agent known to the trade as "Emulsifier L" and comprising a mixture of a polyethylene glycol derivative and an alkylbenzenesulfonate. Three week-old corn and bean plants were sprayed with the suspension, two plants of each variety being employed. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The sprayed corn plants were completely dead and the bean plants were found to be severally injured with foliage dried.

2-phenoxyethyl thiocyanate is particularly valuable from an economic standpoint, because not only does it possess a high degree of herbicidal activity, but it is more readily available than many standard herbicides. Thus 2-phenoxyethyl chloride or 2-phenoxyethyl bromide which are used as intermediates in the preparation of the present compound are materials which are obtainable in good yields by reaction of sodium phenylate with ethylene chloride or ethylene bromide.

The 2-phenoxyethyl thiocyanate is preferably applied to plants by spraying aqueous dispersions of the same, this method affording an easy and inexpensive way of destroying plant growth. However, it is likewise effective when applied in dusts, for example, in admixture with such carriers as clay, lime, talc, bentonite, pumice, fuller's earth, etc. 2-phenoxyethyl thiocyanate is soluble in the usual organic solvents and may be used in solutions, e. g., in kerosene or benzene solution as a herbicidal spray.

Only small amounts of the present compound need be employed. For general utility, concentrations of from, say, 0.1 part to 10 parts of 2-phenoxyethyl thiocyanate per hundred parts by weight of the carrier may be employed, and in this manner an acre of land may be freed of plants by application of only a few pounds of the present herbicide.

What we claim is:

1. A herbicidal composition including a carrier and containing 2-phenoxyethyl thiocyanate as the active ingredient, said thiocyanate being present in said composition in a phytotoxic concentration.

2. A herbicidal composition comprising an aqueous suspension of 2-phenoxyethyl thiocyanate, said thiocyanate being present in said composition in a phytotoxic concentration.

DAVID T. MOWRY.
ARTHUR H. SCHLESINGER.

References Cited in the file of this patent

UNITED STATES PATENTS

| Number | Name | Date |
|---|---|---|
| 2,239,080 | Coleman et al. | Apr. 22, 1941 |
| 2,573,769 | Lambrech | Nov. 6, 1951 |
| 2,608,479 | Boyd | Aug. 26, 1952 |